United States Patent [19]
Gavin

[11] Patent Number: 4,805,920
[45] Date of Patent: Feb. 21, 1989

[54] PIPE SEAL AND CLOSURE MEMBER

[76] Inventor: Norman Gavin, 2545 Ridge Rd., North Haven, Conn. 06473

[21] Appl. No.: 175,662

[22] Filed: Mar. 21, 1988

Related U.S. Application Data

[63] Continuation-in-part of Ser. No. 858,341, May 1, 1986, Pat. No. 4,732,397.

[51] Int. Cl.$^4$ ............................................. F16J 15/10
[52] U.S. Cl. ................................. 277/207 A; 277/9; 277/DIG. 10; 52/21
[58] Field of Search ............ 277/1, 9, 9.5, 11, 207 A, 277/DIG. 2, DIG. 10; 52/20, 21; 285/3, 4, 23, 230, 304

[56] References Cited
U.S. PATENT DOCUMENTS

| | | | |
|---|---|---|---|
| 3,385,012 | 5/1968 | Lovegreen | 52/21 |
| 3,848,074 | 11/1974 | Channell | 277/DIG. 10 X |
| 4,079,193 | 3/1978 | Channell | 277/DIG. 10 X |
| 4,103,901 | 8/1978 | Ditcher | 285/230 X |
| 4,128,107 | 12/1978 | Blumhardt | 277/207 A X |
| 4,602,504 | 7/1986 | Barber | 277/DIG. 10 X |

FOREIGN PATENT DOCUMENTS

| | | | |
|---|---|---|---|
| 269007 | 3/1969 | Austria | 277/207 A |
| 964043 | 3/1975 | Canada | 277/207 A |
| 3136315 | 3/1983 | Fed. Rep. of Germany | 277/207 A |
| 142578 | 7/1980 | German Democratic Rep. | 277/207 A |
| 1211238 | 11/1970 | United Kingdom | 277/207 A |

Primary Examiner—Robert S. Ward
Attorney, Agent, or Firm—Pasquale A. Razzano

[57] ABSTRACT

A seal and closure member of elastomeric material adapted to be cast in situ and comprising a cylindrical body portion and an integral frusto-conical skirt therewithin. A radially outwardly extending flange is embedded in adjacent concrete. The skirt has a knock-out web at its smaller diameter end portion and the seal and closure member may thus be employed selectively as closure members for apertures in distribution boxes and the like and as seals for pipes in communication with the box interiors. The seal also includes integrally formed bosses which allow a baffle to be secured directly thereon on the interior of the box opposite the end of a pipe in the seal.

13 Claims, 5 Drawing Sheets

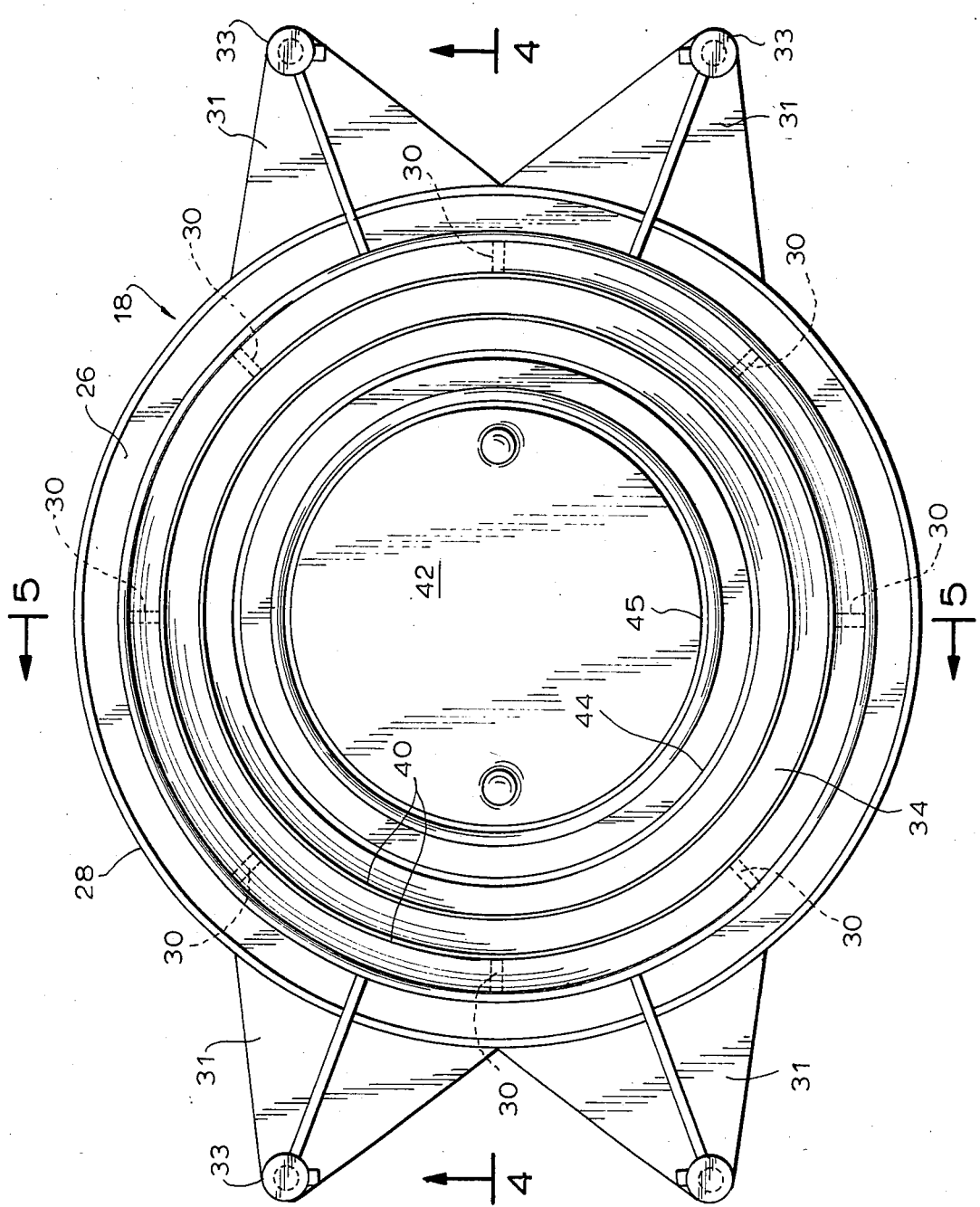
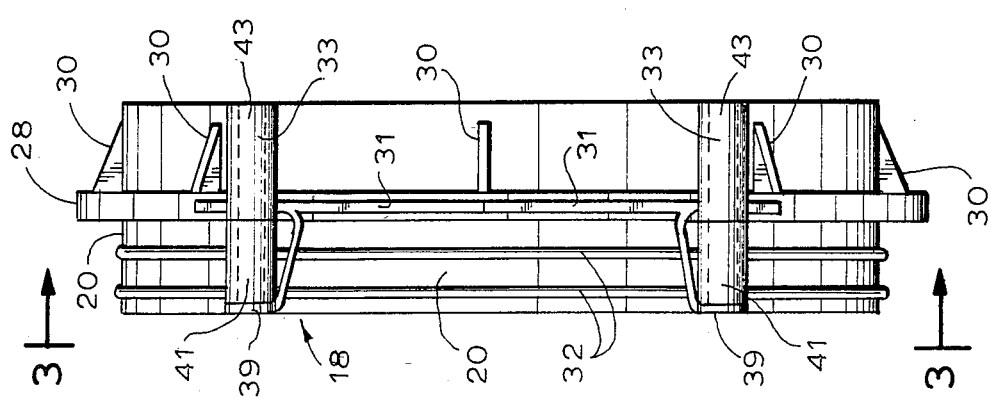
FIG. 3
FIG. 2

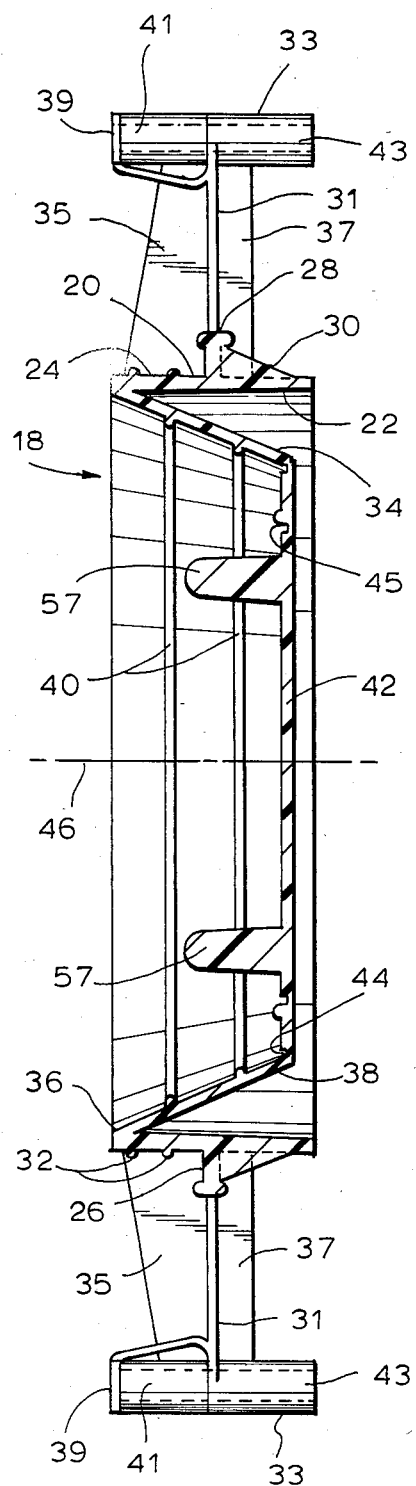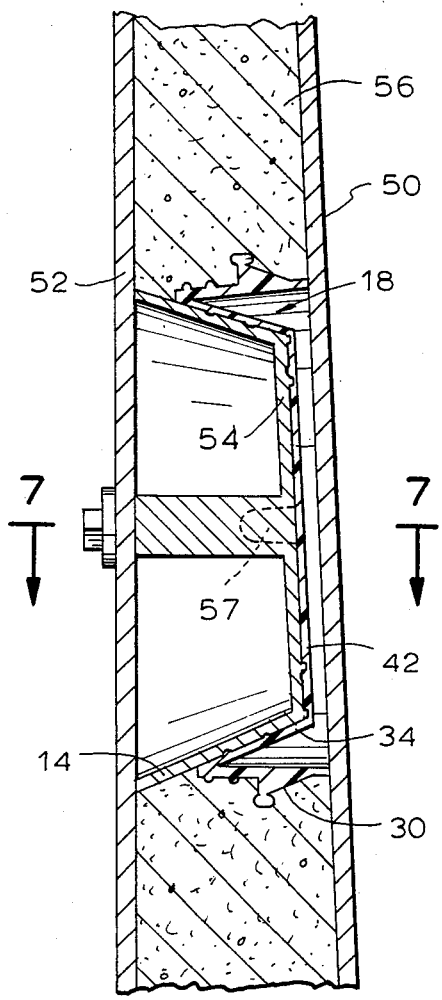
FIG. 4
FIG. 5

PIPE SEAL AND CLOSURE MEMBER

This application is a continuation-in-part of U.S. patent application Ser. No. 858,341, filed May 1, 1986, now U.S. Pat. No. 4,732,397.

BACKGROUND OF THE INVENTION

The present invention relates to a dual purpose pipe seal and closure member for use in low pressure installations as for example septic field distribution boxes and septic tanks. A relatively slow and tedious grouting procedure is commonly used in sealing pipes having end portions in communication with the interior of septic field distribution boxes and the like.

It is the general object of the present invention to provide a pipe seal and closure member which may be cast in situ and which may thereafter be readily employed either as a closure member or as a rapidly assembled and effective seal about an end portion of a pipe in communication with the interior of a distribution box or the like. More particularly, the seal is constructed to selectively accept two different diameter pipes and to accurately and securely provide a quick permanent connection for a baffle arrangement adjacent the end of the pipe inside the distribution box.

SUMMARY OF THE INVENTION

In fulfillment of the foregoing objects a seal and closure member of an elastomeric material is provided which is adapted to be mounted in a cylindrical aperture and to receive an end portion of a pipe in a monolithically cast distribution box or the like of cementitious material.

The seal comprises an annular elastomeric body portion having generally cylindrical inner and outer surfaces with the former defining a central cylindrical pipe receiving opening which extends axially through the body portion and the latter engageable with the aperture wall. An integral annular flange on the body portion extends generally radially outwardly and is adapted to be embedded in the cast cementitious material about the aperture whereby to secure the seal in position in the aperture. A hollow generally frustoconical sealing skirt is formed integrally at its larger diameter end portion with the body portion of the seal and projects inwardly at an angle between radial and axial planes. The skirt departs from the axial direction at an angle between 10 and 45 degrees and preferably at an angle in the neighborhood of 20 degrees. The smaller diameter end portion of the sealing skirt is slightly smaller in diameter than the pipe to be received thereby and is disposed radially inwardly from the inner cylindrical surface of the body portion of the seal. Thus, the said smaller end portion of the skirt is free for at least a nominal degree of expansion diametrically.

As will be apparent, with the seal mounted in an aperture in a distribution box or the like, the frusto-conical sealing skirt is adapted to receive and guide an end portion of a pipe which may be introduced at its larger diameter end portion and urged toward and axially through its said smaller and free end portion. This results in a slight expansion diametrically of the free end portion of the skirt and in any event serves to establish firm frictional engagement and effective sealing between the skirt and the exterior peripheral surface of the pipe. Preferably during assembly, the pipe end portion is urged axially through the skirt a short distance and then retracted for good sealing engagement.

Axial misalignment between pipe and seal is readily accommodated by the skirt with the pipe as much as 15 degrees out of axial alignment.

As mentioned, a dual purpose is envisioned for the seal and closure member and this is accomplished with the provision of a knock-out web which takes the form of a substantially circular disk and which extends radially across the smaller diameter or free end portion of the frusto-conical sealing skirt of the seal. The web is formed integrally with the skirt and is provided with a weakened narrow annular portion adjacent the free end portion of the skirt whereby to facilitate web knock-out. That is, preferably, a narrow annular band of reduced thickness is provided at the junction between the knock-out web and the smaller diameter end portion of the skirt. As will be apparent, the seal can be cast in situ during precasting of a septic field distribution box or the like and each such seal may be provided with a knock-out web. Thereafter, with a number of apertures and corresponding seals in the distribution box, those apertures which are to be provided with pipes may be selected and the corresponding knock-out webs may be removed as by means of a punching action with a screw driver. The pipe end portions may then be engaged or assembled with the seals as described above and the remaining seal and closure members may be left in the aperture closing condition with the knock-out webs intact.

As a further improvement the knock-out web includes a secondary knock-out portion which has a further weakened narrow annular portion, inwardly of the weakened annular portion at the free end of the skirt. By this arrangement the user can selectively knock out the entire web, or only a smaller portion of it, so that the seal may selectively accommodate two differently sized pipes. As a result a manufacturer need only purchase and use a single seal even though two differently sized pipes may be connected to the distribution box.

Yet a further improvement is the provision on the seal of an integral boss arrangement which permits a deflection baffle to be mounted directly on the seal opposite the end of a pipe mounted in the seal. This arrangement eliminates any need for the manufacturer or assembler to drill into the concrete of the box for purposes of securing a baffle to the interior of the box.

The above and other objects, features and advantages of the present invention will be apparent from the following detailed description of an illustrative embodiment thereof which is to be read in connection with the accompanying drawing wherein:

BRIEF DESCRIPTION OF THE DRAWINGS

FIG. 2 is an enlarged side view of a seal and closure member constructed in accordance with the present invention.

FIG. 3 is an enlarged end view of a seal and closure member taken generally as indicated at 3, 3 in FIG. 2.

FIG. 4 is a sectional view through the seal and closure member taken generally as indicated at 4, 4 in FIG. 3.

FIG. 5 is a fragmentary vertical section through a portion of a distribution box and shows a seal and closure member cast in situ with portions of associated forms.

DESCRIPTION OF THE PREFERRED EMBODIMENT

Figure 1:
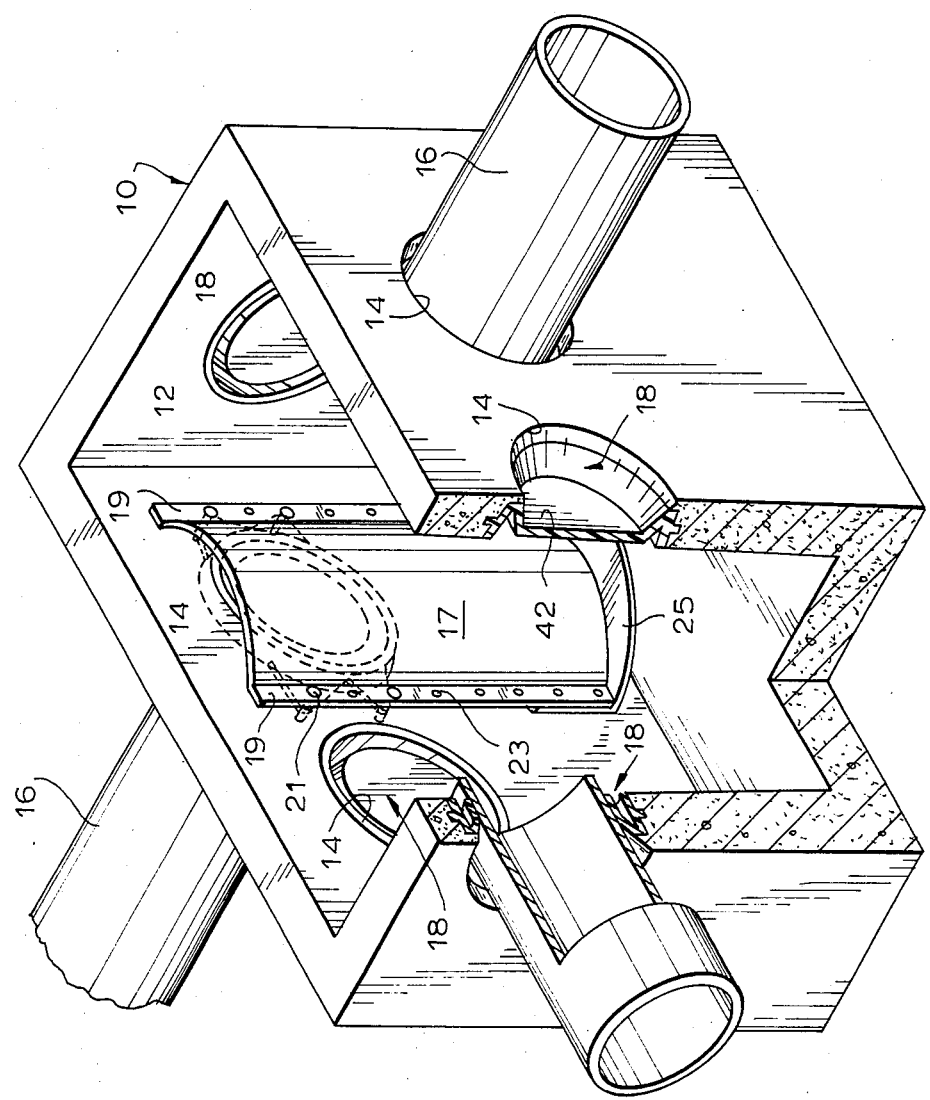
FIG. 1 is a perspective view partially broken away for clarity of illustration, and showing somewhat schematically a septic field distribution box with three (3) end portions of pipes entered in apertures therein and in communication with the interior thereof.

Referring now to the drawings in detail and in particular to FIG. 1, a septic field distribution box as indicated generally at 10 and is of a conventional monolithically cast construction and of a cementitious material, as shown, e.g. concrete. The box has an aperture 12 in each end wall and two (2) apertures in each of the front and back side walls of the box are similarly provided with a pipe 16. The remaining apertures are unused and are each provided with a seal and closure member 18 so as to prevent flow therethrough. Seal and closure members 18 associated with the pipes 16 shown have been converted to pipe seals by removal of their knock-out webs. A plastic baffle 17 having a generally semi-cylindrical shape, or the like, includes integral edge flanges 19 which are secured to the box 10 on the inner surface thereof opposite the end of the pipe 16 extending through the back wall of the box. The baffle is mounted on the adjacent seal and closure member 18 by screws 21 which extend through holes 23 formed in flanges 19 and into member 18. A deflector baffle 25 may be secured to the end of baffle 17 if desired.

Referring to FIGS. 2 through 4, it will be observed that the seal end closure member 18 includes an annular body portion 20, FIG. 4, which has generally cylindrical inner and outer surfaces 22, 24. As shown in FIG. 4, there is a slight relative inclination of the surfaces 22, 24 from right to left or front to rear with the body portion thus becoming somewhat thinner in progression toward the rear. Various other configurations fall within the scope of the invention. The inner cylindrical surface 22 defines a central cylindrical pipe receiving opening which extends axially through the body portion 20. The outer cylindrical surface 24 is engageable with the wall of an aperture in a distribution box such as the box 10 in a manner to be more fully described hereinbelow.

As best illustrated in FIG. 4, an integral annular flange 26 extends generally radially outwardly from the body portion 20. Flange 26 may optionally carry a rim 28 at an outer portion thereof and which extends generally axially therefrom. The flange 26 and rim 28 are adapted to be embedded in cast cementitious material about an aperture whereby to secure the seal and closure member in position in the aperture. Precasting of the seal and closure member in situ will be further described hereinbelow.

Preferably, a plurality of circumaxially spaced small integrally formed generally triangular gussets 30, 30 are provided and each such gusset extends in an axial plane between the flange 26 and the body portion 20. As shown in FIG. 3, eight (8) gussets 30, 30 are provided. Further, annular strengthening ribs may be provided in the body portion 20 as illustrated at 32, 32.

A hollow generally frusto-conical sealing skirt 34 is formed integrally at a larger diameter end portion 36 with the seal body portion 20 and projects inwardly at an angle between radial and axial planes as best illustrated in FIG. 4. The smaller diameter end portion 38 of the skirt 34 is slightly smaller in diameter than the external diameter of the pipe to be received therethrough and is disposed radially inwardly from the inner cylindrical body surface 22 and is thus free to expand diametrically. Annular strengthening ribs may also be provided as at 40, 40 in the body of the skirt 34.

As illustrated in FIG. 4, the skirt 34 is provided at its free end portion 38 with a knock-out web 42 which takes the form of a substantially circular disk and which extends radially across the said free end portion of the skirt. The knock-out web 42 is formed integrally with the skirt 34 and has a weakened narrow annular portion 44 adjacent the skirt free end portion to facilitate web knock-out. Preferably and as illustrated, the weakened annular portion of the web 42 takes the form of a narrow band 44 of reduced thickness but imperforate elastomeric material which interconnects the skirt end portion 38 and the web 42.

Web 42 is also provided with an inner annular narrow band 45 of reduced thickness, inwardly of an annular rib 47. In one embodiment the band 45 is located one-half an inch radially inwardly of band 44 so that the user can selectively knock out the inner disk defined by band 45 or the larger disk defined by band 44 so that the seal can selectively receive differently sized pipes, e.g. a 4 inch pipe or a three-inch diameter pipe.

The skirt 34 preferably resides at an angle between 10° and 45° with the axis of the aperture and seal as indicated at 46 and, more particularly, it is presently believed that an angle in the neighborhood of 20° will provide optimum results. The material of the seal and closure member may vary widely within the scope of the invention and, for example, may comprise any of a number of known thermoplastic materials.

Figure 9:
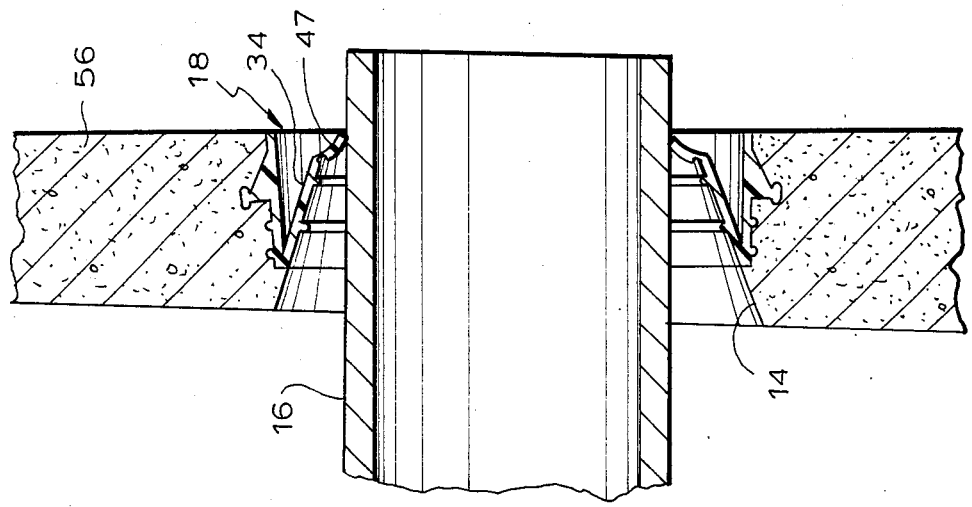
FIG. 9 is a view similar to FIG. 8 but with an end portion of a pipe entered into sealing engagement with the seal of the present invention.
Figure 8:
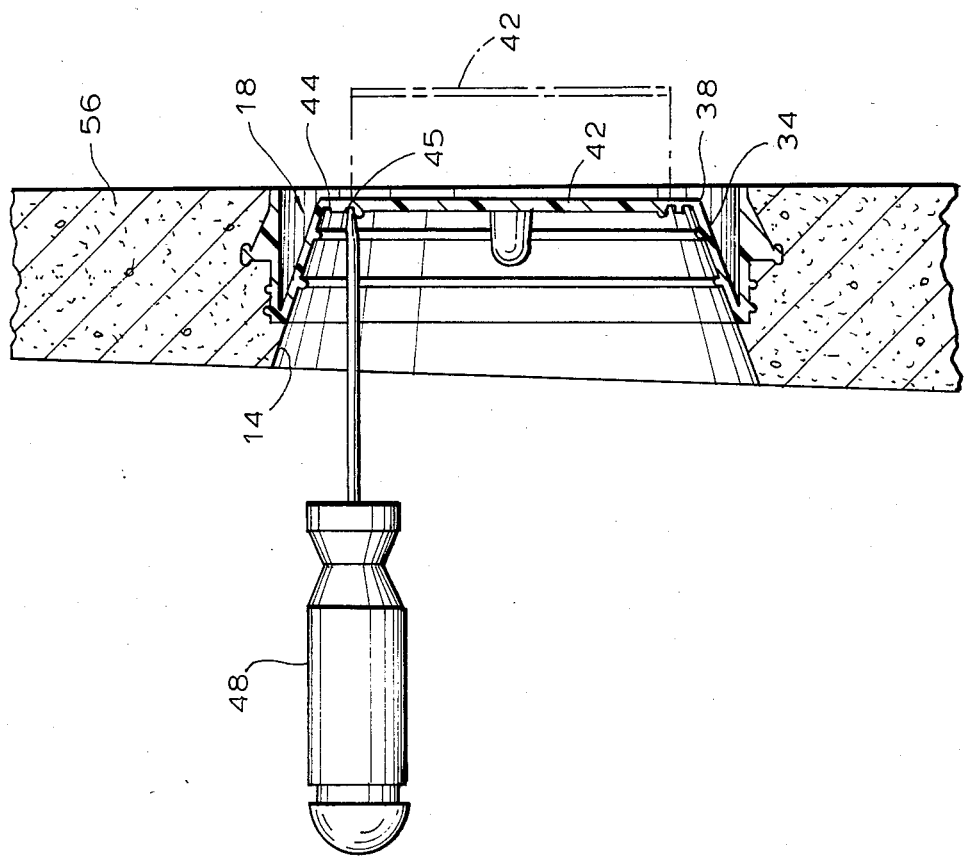
FIG. 8 is a view similar to FIGS. 5 and 6 but with the forms omitted and with the knock-out web in a knock-out operation.

FIGS. 8 and 9, the manner in which a seal 18 cooperates with a pipe 16 in assembly is illustrated. As shown therein the smaller inner disk of the knock-out web 42 is removed by means of a punching operation with a screw driver 48, at band 45. With the pipe 16 moved axially rightwardly in FIG. 9, it will be apparent that its end portion may be introduced to the sealing skirt 34 and urged toward and axially through its free or smaller diameter end portion. Preferably, the pipe is moved rightwardly from the position shown in FIG. 9 through a distance of a few inches and then retracted to the position shown in order to establish firm frictional engagement and effective sealing between the exterior peripheral surface of the pipe and the skirt 34. In this case the rib 47 aids in forming a seal on the pipe and the narrow band 44 permits the annular portion of disk 42 between bands 44 and 45 to bend outwardly around the pipe.

Figure 10:
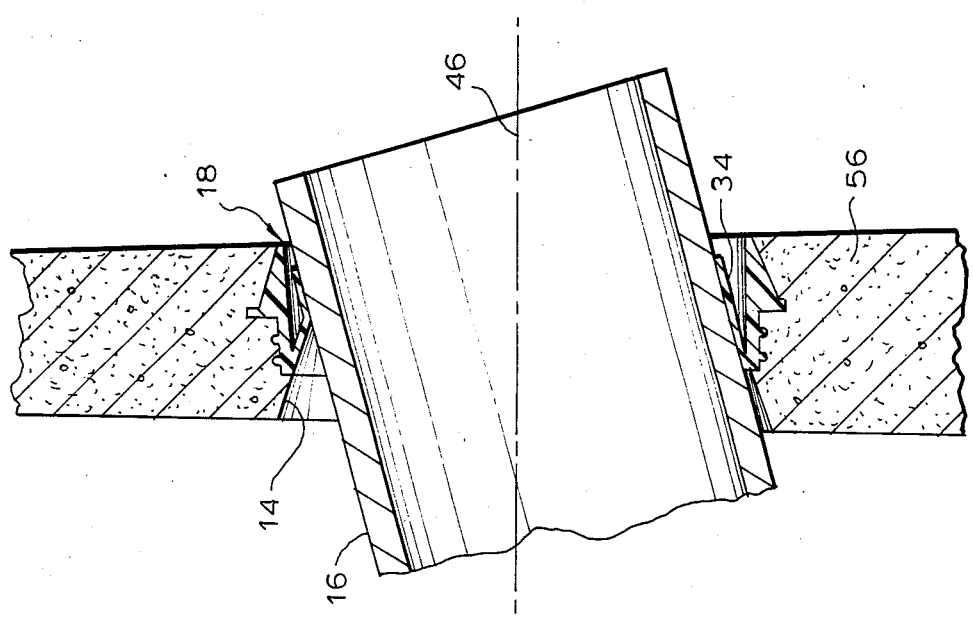
FIG. 10 is a view similar to FIG. 8 but showing a portion of the distribution box, a pipe seal, and a severely misaligned end portion of a pipe.

In FIG. 10, a pipe 16 is illustrated in a condition of severe axial misalignment as compared with the substantially precise axial alignment of the pipe 16 in FIG. 8. That is the pipe in FIG. 10 is perhaps as much as 15° in axial misalignment with an axis 46 of seal 18. Nevertheless, as shown, the skirt 34 is capable of accommodating such misalignment of the pipe and the skirt remains in firm engagement and in good sealing contact with the exterior surface of the pipe.

As also shown in FIGS. 2-4, the member 18 has integrally formed arms 31 extending in opposed generally radially extending pairs. The arms 31 are generally triangularly shaped and have hollow cylindrical bosses 33 formed at the ends thereof. These bosses extend generally parallel to the axis 46 of the seal. The arms 31 are reinforced by opposed, perpendicularly extending buttress walls 35, 37.

In the molding process, in order for the bosses to be formed with hollow cylindrical cores their ends must be open to permit removal of the mold elements. Accordingly, removable plugs 39 are provided on the inner ends 41 of bosses 33 to permit the user to close those ends before the seals are mounted in the distributor box forms, as described hereinafter, to prevent concrete from entering the hollow cores of these bosses. The opposite ends 43 of bosses 33 are arranged to align with the inner surface of the distributor box when formed to permit the baffle to be mounted thereon by the screws 21 which are threaded into the cores of bosses 33.

Figure 6:
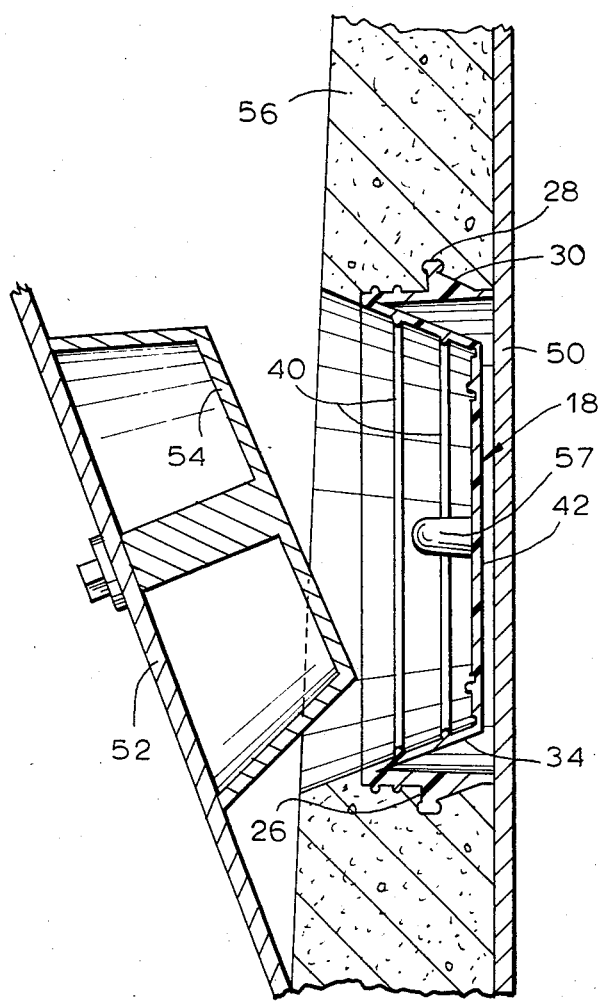
FIG. 6 is a view similar to FIG. 5 but shows a portion of a form in a retracted position.
Figure 7:
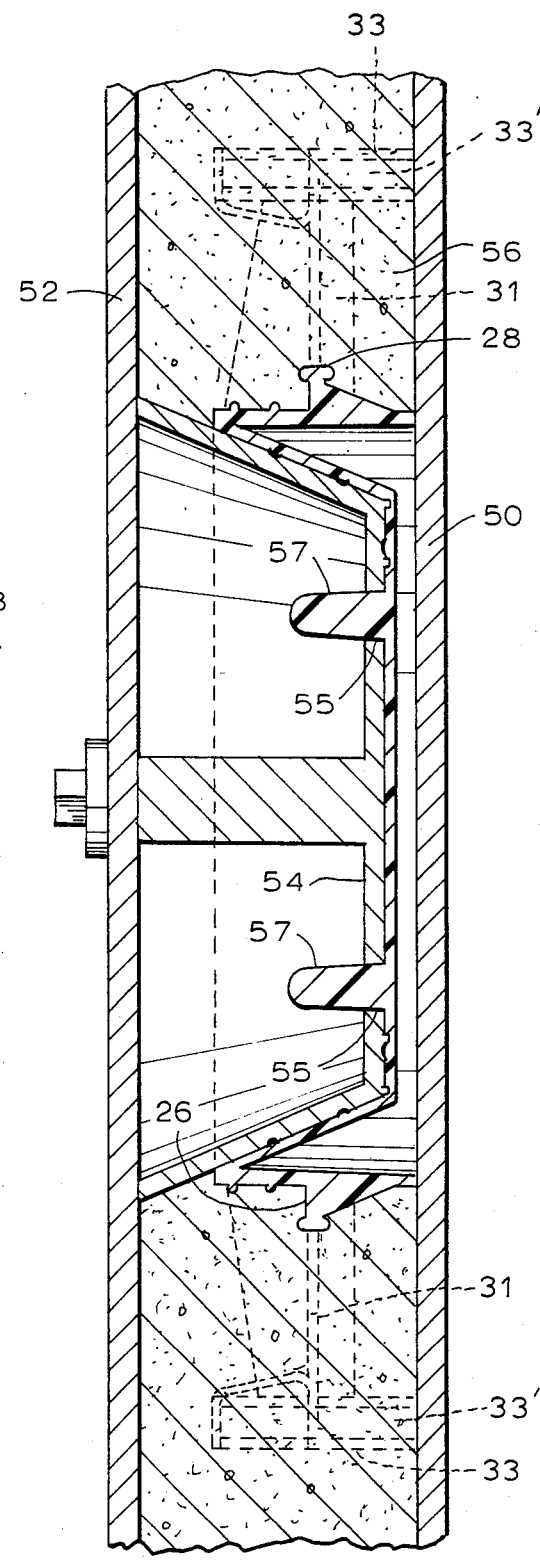
FIG. 7 is a horizontal sectional view taken along line 7, 7 of FIG. 5.

Referring now to FIGS. 5-7, the manner in which the seal may be cast in situ is illustrated. A portion of a foam core is shown at 50 with a portion of a foam jacket illustrated at 52. The jacket 52 is adapted for movement relative to the core and may be swung from the FIG. 5 position to the FIG. 6 position as illustrated. With the core 50 and jacket 52 in the relative positions of FIG. 5, a plug 54 carried by the jacket 52 may be employed to mount a seal and closure member 18 as illustrated. That is, the seal and closure member may be fitted on and about the plug internally of the core and jacket. Preferably the core 54 has a pair of apertures 55 formed therein adapted to receive pins 57 integrally formed on the disk 42 of the seal. The apertures 55 and pins 57 are arranged so that when engaged, the arms 31 are located in the mold so that the bosses 33 on opposite sides of the seal are vertically aligned, as shown in dotted lines in FIG. 1, to align with the holes 23 in the flanges 19 of baffles 17. In addition, by this construction, the front faces 33' of the bosses are flush with core 50 and, thus, exposed at the inner face of the concrete when the form or mold is stripped.

Subsequently, and during casting of the concrete 56 forming a portion of the distribution box or other precast structure, the seal and closure member serves as an integral part of the form together with the core 50, the jacket 52, and the plug 54. That is, the concrete 56 is cast about the seal and the seal serves to partially define an aperture 14 in the cast structure. The remaining portion of the aperture 14 is defined by the plug 54, and when the jacket 52 and the plug 54 are swung in a counterclockwise direction as illustrated in FIG. 6, the cast structure may be removed from the core 50 to provide a seal and closure member containing aperture 14, as best illustrated in FIG. 8. Thereafter, the seal and closure member 18 may be employed selectively to close the aperture 14 or to seal a pipe therein respectively by retention or removal of the knock-out web 42. In addition, baffle 17 can be secured to the distribution box adjacent the end of a pipe therein by simply inserting screws through the flanges 19 into the hollow bosses 33. This eliminates any need for drilling the concrete to mount a baffle thereon and permits rapid and accurate mounting of the baffle to the box opposite the pipe end.

From the foregoing, it will be apparent that a highly effective dual purpose seal and closure member has been provided. Apertures in distribution boxes and the like may be selectively closed or provided with pipes or different diameters in communication with the interior or the box merely through the selective removal of appropriate knock-out webs. A quickly assembled and efficient sealing operation of a desired number of pipes is provided for in the distribution boxes and the like and the seal and closure members can be provided at substantial economic advantage as a result of the casting of the same in place during casting of the boxes or the like.

What is claimed is:

1. A combination aperture closure and low pressure seal for an exterior surface of a pipe adapted to be mounted in a cylindrical aperture and to receive an end portion of a pipe in a monolithically cast fluid distribution box or the like of cementitious material; said seal being composed of molded elastomeric material and comprising an annular body portion having generally cylindrical inner and outer surfaces, the former defining a central cylindrical pipe receiving opening which extends axially through the body portion and the latter engageable with the aperture wall, an integral annular flange on said body portion extending generally radially outwardly and adapted to be embedded in the cast cementitious material about the aperture during casting of said box whereby to secure the seal in position in the aperture, and a hollow generally frusto-conical sealing skirt formed integrally at its larger diameter end portion with the seal body portion and projecting inwardly at an angle between radial and axial planes, the smaller diameter end portion of said sealing skirt being slightly smaller in diameter than the pipe to be received and being disposed radially inwardly from said inner cylindrical body surface and free to expand diametrically, said frusto-conical sealing skirt being adapted to receive and guide an end portion of a pipe introduced at its said larger diameter end portion and urged toward and axially through its said free smaller diameter end portion whereby to slightly diametrically expand said free end portion and thus to establish firm frictional engagement and effective sealing thereof with the exterior peripheral surface of the pipe, said seal further including a knock-out web which takes a substantially circular disc configuration and which extends radially across the smaller diameter free end portion of the frusto-conical sealing skirt, said web being molded integrally with the skirt and having an integrally molded first weakened narrow annular portion adjacent the skirt free end portion to facilitate web knock-out and a second weakened narrow annular portion radially inwardly of said first weakened annular portion so that said web can be knocked out at either said first or said second weakened narrow annular portions whereby said seal can serve a dual purpose selectively as a closure for an associated aperture and a seal for pipes of one of two different diameters entered in the aperture.

2. A seal for an exterior surface of a pipe adapted to be mounted in a cylindrical aperture and to receive an end portion of a pipe in a monolithically cast fluid distribution box or the like of cementitious material; said seal being composed of molded electromeric material and comprising an annular elastomeric body portion having generally cylindrical inner and outer surfaces, the former defining a central cylindrical pipe receiving opening which extends axially through the body portion and the latter engageable with the aperture wall, an integral annular flange on said body portion extending generally radially outwardly and adapted to be embedded in the cast cementious material about the aperture whereby to secure the seal in position in the aperture, and a hollow generally frusto-conical sealing skirt formed integrally at its larger diameter end portion with the seal body portion and projecting inwardly at an angle between radial and axial planes, the smaller diameter end portion of said sealing skirt being slightly smaller in diameter than the pipe to be received and being disposed radially inwardly from said inner cylindrical body surface and free to expand diametrically, and said frusto-conical sealing skirt being adapted to receive and guide an end portion of a pipe introduced at its said larger diameter end portion and urged toward and axially through its said free smaller diameter end portion whereby to slightly diametrically expand said free end portion and thus to establish firm frictional engagement and effective sealing thereof with the exterior peripheral surface of the pipe; said seal having a plurality of integrally formed generally radially extending arms including mounting bosses formed thereon and extending generally perpendicularly to said arms and generally parallel to the axis of a pipe inserted in the seal, whereby a baffle may be secured opposite the end of a pipe inserted in the seal by securing the baffle to said bosses.

3. A seal as set forth in claim 2 wherein said annular radially outwardly extending flange has an integral annular rim at an outer portion thereof, said rim projecting generally radially from the flange for secure retention in the cast cementious material.

4. A seal as set forth in claim 3 wherein a plurality of circumaxially spaced small integrally formed generally triangular gussets are provided in axial planes and between said flange and body portion.

5. A seal as set forth in claim 2 wherein said frusto-conical skirt is formed integrally with the body portion of the seal at the larger diameter end portion of the skirt and at a front end portion of the body portion.

6. A seal as set forth in claim 5 wherein the axial dimension of said skirt is such that it does not project beyond the rear end portion of said body portion.

7. A seal as set forth in claim 4 wherein said skirt projects inwardly at an angle between 10° and 45° from the axis of the seal opening.

8. A seal as set forth in claim 7 wherein said skirt projects at approximately a 20° angle from the axis.

9. A seal as set forth in claim 2 wherein said seal is adapted to serve a dual purpose selectively as a closure for an associated aperture and a seal for a pipe entered in the aperture, and wherein said seal includes a knockout web which takes a substantially circular disc configuration and which extends radially across the smaller diameter free end portion of the frusto-conical sealing skirt, said web being formed integrally with the skirt and having a weakened narrow annular portion adjacent the skirt free end portion adjacent the skirt free end portion to facilitate web knock-out.

10. A seal is set forth in claim 9 wherein said weakened annular portion of said web takes the form of a narrow band of reduced thickness but imperforate elastomeric material.

11. A seal as set forth in claim 9 wherein said skirt projects inwardly at an angle between 10° and 45° from the axis of the seal opening.

12. A seal as set forth in claim 10 including a second weakened annular portion formed in the web readily inwardly of the first mentioned portion whereby said seal may selectively receive one of two different diameter pipes.

13. A seal as set forth in claim 2 including screw means for securing a baffle to said bosses.

* * * * *